(12) United States Patent
Breest et al.

(10) Patent No.: US 8,142,705 B2
(45) Date of Patent: Mar. 27, 2012

(54) METHOD FOR PRODUCING A MOULDED SKIN AND MOULD ARRANGEMENT THEREFORE

(75) Inventors: Jürgen Breest, St. Augustin (DE); Hugo De Winter, Kalken (BE); Geert Van Houcke, Aalst (BE)

(73) Assignee: Recticel Automobilsysteme GmbH, Rheinbreitbach (DE)

( * ) Notice: Subject to any disclaimer, the term of this patent is extended or adjusted under 35 U.S.C. 154(b) by 0 days.

(21) Appl. No.: 12/994,732

(22) PCT Filed: Jul. 6, 2009

(86) PCT No.: PCT/EP2009/058493
§ 371 (c)(1),
(2), (4) Date: Jan. 13, 2011

(87) PCT Pub. No.: WO2010/003915
PCT Pub. Date: Jan. 14, 2010

(65) Prior Publication Data
US 2011/0115127 A1    May 19, 2011

(30) Foreign Application Priority Data
Jul. 5, 2008    (DE) .......................... 10 2008 031 841

(51) Int. Cl.
*B29C 41/08* (2006.01)
*B29C 41/20* (2006.01)
*B29C 41/38* (2006.01)
*B29C 41/40* (2006.01)

(52) U.S. Cl. ........ 264/309; 264/275; 264/274; 264/261; 264/313

(58) Field of Classification Search .................. None
See application file for complete search history.

(56) References Cited

U.S. PATENT DOCUMENTS 3,876,176 A * 4/1975 Morin .............................. 249/96
3,925,529 A * 12/1975 Bernier et al. ................. 264/244
4,792,111 A * 12/1988 Taguchi ........................... 249/83
(Continued)

FOREIGN PATENT DOCUMENTS

JP    2000-108148    4/2000
(Continued)

OTHER PUBLICATIONS

International Search Report for International Application No. PCT/EP2009/058493 mailed on Mar. 31, 2010 (3 pages).
(Continued)

*Primary Examiner* — Edmund H. Lee
(74) *Attorney, Agent, or Firm* — Margaret Polson; Oppedahl Patent Law Firm LLC

(57) ABSTRACT

A method for manufacturing molded flexible plastic skins (9, 24, 27, 34) differing in their shape from each other, each skin being molded against a mold surface (2) of a mold (1), comprises the steps: —providing a mold surface (2) matching the shape of the skin to be molded by using a first mold surface provided by the mold itself or by altering the first mold surface by placing one or more mold inserts covering only a part of the first mold surface onto said mold surface and thereby providing an alternative second mold surface, —applying a plastic compound to be brought to shape by the mold surface (2) provided, —bringing to shape the plastic compound applied to the mold surface (2), and —demolding the molded skin (9) from the effective mold surface (2).

15 Claims, 4 Drawing Sheets

U.S. PATENT DOCUMENTS

| | | | | |
|---|---|---|---|---|
| 4,839,122 A | * | 6/1989 | Weaver | 264/129 |
| 4,842,916 A | * | 6/1989 | Ogawa et al. | 428/100 |
| 4,931,344 A | * | 6/1990 | Ogawa et al. | 428/100 |
| 5,053,179 A | * | 10/1991 | Masui et al. | 264/257 |
| 5,286,431 A | * | 2/1994 | Banfield et al. | 264/134 |
| 5,598,610 A | * | 2/1997 | Torigoe et al. | 24/444 |
| 5,922,436 A | * | 7/1999 | Banfield et al. | 428/100 |
| 6,368,538 B1 | * | 4/2002 | Kitterman | 264/274 |
| 6,620,371 B1 | * | 9/2003 | Winget et al. | 264/513 |
| 6,929,771 B1 | * | 8/2005 | Abrams | 264/511 |
| 7,005,091 B2 | * | 2/2006 | Cowelchuk et al. | 264/46.5 |
| 7,101,505 B2 | * | 9/2006 | Winget et al. | 264/513 |
| 7,442,334 B2 | * | 10/2008 | Hara et al. | 264/257 |
| 2004/0222557 A1 | * | 11/2004 | Parrish | 264/275 |

FOREIGN PATENT DOCUMENTS

| | | |
|---|---|---|
| JP | 2004-082535 | 3/2004 |
| WO | 95/32850 | 12/1995 |
| WO | 02/09977 | 2/2002 |
| WO | 02/26461 | 4/2002 |
| WO | 2004082917 | 9/2004 |
| WO | 2005/021230 | 3/2005 |

OTHER PUBLICATIONS

International Preliminary Report on Patentability for International Application No. PCT/EP2009/058493 completed on Nov. 10, 2010 (9 pages).

Written Opinion for International Application No. PCT/EP2009/058493 completed on Nov. 10, 2010 (5 pages).

* cited by examiner

METHOD FOR PRODUCING A MOULDED SKIN AND MOULD ARRANGEMENT THEREFORE

CROSS REFERENCE APPLICATIONS

This application is a National Stage entry of PCT/EP2009/058493 filed Jul. 6, 2009 which claims priority from German application number 10 2008 031841.8 filed Jul. 5, 2008.

FIELD OF THE DISCLOSURE

The invention relates to a method for manufacturing moulded flexible plastic skins differing in their shape from each other, each skin being moulded against a mould surface of a mould, comprising the steps:
  providing a mould surface matching the shape of the skin to be moulded by using a first mould surface provided by the mould itself or by altering the first mould surface by placing one or more mould inserts covering only a part of the first mould surface onto said mould surface and thereby providing an alternative second mould surface,
  applying a plastic compound to be brought to shape by the mould surface provided,
  bringing to shape the plastic compound applied to the mould surface, and demoulding the moulded skin from the effective mould surface.
The invention further relates to a mould arrangement for manufacturing moulded flexible plastic skins differing in their shape from each other.

BACKGROUND

Besides other applications, flexible moulded skins are used in many cases in the interior lining of motor vehicles. A typical field of application of these flexible moulded skins are dashboard trim panels or panels of vehicle doors. In these linings and panels respectively the moulded skins form the visible surface of such a lining. Usually located on the back of these flexible moulded skins is a foam layer, which in turn is backed against a support structure of hard plastic serving to support the intermediate foam layer and the moulded skin. Such a lining element is typically fastened with its support structure, which is stable compared with the foam layer and the moulded skin. Such trim part can be manufactured by means of the so-called indirect back-foaming process, in which the moulded skin is transferred into another mould in order to connect this to the support structure by way of the foam layer. It is likewise possible to effect the bringing together of moulded skin and support structure by way of a so-called direct back-foaming process as approximately described in WO 02/26461A.

Such moulded skins are produced, as described in principle in WO 95/32850 A1, by spraying a plastic compound onto the mould surface of a mould and then allowing the plastic compound to cure. For example, polyurethane is suitable for producing flexible moulded skins but other plastics are also used to produce such moulded skins. The visible surface of such a flexible moulded skin if provided for automotive use, typically has a leather-simulated, grained surface structure. In order to meet design requirements for such moulded skins to be multicoloured, in WO 95/32850 A1 it has been suggested to cover specified regions of the mould surface of the mould with a mask so that in a first spraying step for applying an uncured plastic compound in a first colour to the mould surface, the regions not covered by the mask are sprayed and then, after removing the mask, the regions of the mould surface then exposed are sprayed with a different-coloured uncured plastic compound. In this way, moulded skins in different colours can be produced with one and the same mould. If the uncured plastic compound is applied to the mould surface by spraying, such a moulded skin is also referred to as a spray-skin.

WO 02/09977 A1 discloses a method of how to connect pre-manufactured inserts, for example design applications to the moulded skin by using the adhesive forces of the uncured plastic compound or those released during the process of curing (cross-linking). The aim of this measure is to connect inserts to the moulded skin already during the shaping process of the moulded skin so as to avoid need of the incorporating recesses in the pre-fabricated moulded skin to allow the mounting of inserts thereon. This process is not suitable, however, when the inserts comprise sensitive parts or those which are to be disposed, for example, in an undercut of the mould surface. In addition, there is the desire for further individualisation of the interior design of motor vehicles. Thus, in some cases it is desired that parts of an interior lining have an flexible moulded skin surface and for example, leather or wood applications. This cannot be achieved with the method described in WO 02/09977 A1. For this reason, for each moulded skin variant of a moulded skin family, it is necessary to provide its own mould with a correspondingly different mould surface. These moulds differ in respect of the shape of those regions of the mould surface in which a variant formation is provided, wherein such a variant formation is to be effected not merely by means of a different colouring, as described in WO 95/32850 A1.

EP 1 320 451 B1 discloses the use of a flexible liner to be introduced into a mould in order to cover mould seams. Such liner forms at least a portion of the mould surface. With the mould disclosed in this prior art document it is not possible to manufacture skins differing in their shape.

A method and a mould arrangement according to the preamble of independent claims 1 and 12 is disclosed in JP 2004-082535 A. According to the teachings of this prior art document a first flexible skin may be manufactured by using the mould surface of the mould provided. In order to manufacture a variant of that skin a mould insert is positioned on the mould surface. The insert has the matching shape of a recess of the skin to be manufactured. The mould insert is fixed to the mould surface by a magnet arranged on the backside of the mould surface of the mould. The mould insert is therefore manufactured from a material with ferromagnetic properties. When a skin is manufactured in the mould with the mould insert arranged on the mould surface a skin with such recess may be manufactured.

The method and arrangement disclosed in JP 2004-082535 A allow to manufacture different variants of a flexible skin differing in the presence of recesses. These recesses, which are produced by the use of a mould insert on the mould surface are used in order to fasten inserts such as a loudspeakers thereon. The variants of the alternative skins to be manufactured are however limited to certain sizes of recesses, into which inserts need to be placed. A further drawback is that the alternate sections of such manufactured skin may most preferably not be used in those sections of the skin, which are visible, when in use. This is caused by the fact that uncured plastic compound tends to creep between the mould insert and the first mould surface causing burs on the edges of the produced recess. Therefore there is a need for covering this recess by a blind of the insert to be mounted in such recess so that the formed burs are hidden from view.

In the light of the prior art discussed above it is an aspect of the invention to improve the method and the mould arrangement disclosed in JP 2004-082535 A in that a wider range of variants may be manufactured, whereas the sections of the manufactured skin shaped by a mould insert may be used as a visible surface if desired.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

This aspect is achieved according to the invention by way of a method comprising the features of claim 1 and/or by way of a mould arrangement comprising the features of claim 12.

In this method, one and the same base mould is used to produce different variants of a flexible moulded skin, for example a spray-skin. The mould surface provided by the mould may be modified to achieve a variant of the moulded skin to be formed with the mould surface by applying one or more mould inserts onto the first mould surface provided by the base mould. By applying one or more mould inserts to the first mould surface the effective mould surface provided by the mould is altered by each mould insert. When manufacturing flexible skins the base mould with its first mould surface is used for moulding the skin or this mould surface is varied by introducing one or more mould inserts onto the mould, depending on the shape of the skin to be moulded. Thus, a modular mould arrangement is supplied. The one or more mould inserts have flexible properties. This enables easy demoulding of the mould inserts from the moulded skin after curing of the plastic compound, simply by stripping off the inserts after the skin has been taken out of the base mould. The use of a flexible mould insert allows to demould a moulded skin even with a complex geometry for example undercuts without needing mould slides or the like. The mould inserts are hold on the first mould surface in that their side surfaces bordering to their own mould surface are arranged abutting to walls being arranged angularly to the first mould surface provided by the base mould. Such walls may be made by walls upstanding from the first mould surface, shoulders or the like. Making use of the flexible properties of the mould inserts these may be arranged in a pre-stressed way with their side surfaces abutting said walls under pre-stress. With such mould arrangement the compound plastic applied to the effective mould surface cannot creep between the abutting parts.

The mould inlays used only cover part of the first mould surface. Therefore the effective mould surface of such mould when having inserted one or more mould inlays is made up of the non-overlapped section of the first mould surface and the mould surface of the one or more mould inserts arranged onto the first mould surface.

The one or more mould inserts may alter the shape of the skin to be produced in various manners. The mould inserts may be used to create recesses or the like in the skin or completely alter a section or a part of the skin to be moulded compared to the shape of the skin when being moulded on the moulding surface of the base mould. Further, by applying inserts with a different geometry as to their mould surface skins for instrument panels may easily be altered depending on the application thereof in a car, for example instrument panel skins for a right hand driven vehicle and a left hand driven vehicle may be differenciated. The beforegoing examples illustrate, that a wide range of variants of different shaped skins may be manufactured using one and the same base mould which is altered in respect of its effective mould surface by implementing one or more mould inserts.

The mould inserts may also be used to manufacture skins differing at least in certain sections in their appearance by a different visible texture. Such texturized visible surfaces may simply be manufactured by using different inserts with a different texturized mould surface, against which the compound plastic is moulded.

The arrangement of the mould inserts abutting with their side surfaces against an upstanding wall of the first mould surface enables the manufacture of moulded skins with visible corners or grounded edges, which not necessarily need to be covered by a blind of an insert.

This method can be used to produce moulded skins by a spraying process as well as other methods as reaction injection moulding (RIM) process. Thus, the method can be used for different production processes for forming a moulded skin, which methods are described in WO 2005/021230 A1.

The term "bringing to shape" the plastic compound applied to the effective mould surface is to be understood in that this comprises the application of a flowable plastic compound as well as the application or insertion of a plastic film or plastic foil, which is brought into its prescribed shape using the mould surface. Consequently, the step of applying the plastic to be moulded by the mould surface to the mould can comprise spraying on of the plastic compound or the insertion of a pre-fabricated plastic film or foil, which is then brought to shape. If a flowable plastic compound is applied to the mould, the term "bringing to shape" is to be understood as allowing the same to cure on the mould surface. Thus, all such steps in which the mould material is brought to the desired shape are to be subsumed under this term.

The term "flexible" addressing a property of a mould insert is to be understood in that the mould insert may be bent to a certain extent without breaking thus enabling a user to separate (demould) the insert from the moulded skin by peeling it off. For example, a silicone mould insert shows the kind of flexible characteristics required, whereas a wide range of other materials are also suitable, also with a lesser or even higher degree of flexibility.

The mould insert or inserts used are made of an flexible material. The flexibility of the mould inserts can exceed the flexibility of the moulded skin to be produced, if desired. The material properties of the mould inserts are adapted to the complexity of the effective mould surface to be provided. This also applies to the respective position in or at which such mould inserts are to be attached on or at the mould surface. The use of flexible mould inserts allows the formation of specified moulds without sliders or the like being necessary in the mould itself. This is compensated by the flexibility of the mould inserts used, which may further show a certain degree of elasticity.

The mould inserts preferably have material properties so that the plastic compound used to produce the moulded skin does not adhere to them or only adheres insignificantly. In addition to this or also independently of this, the surface of the mould inserts can be coated with a release agent, which release agent prevents any adhesion of the uncured plastic compound to the mould insert. When polyurethane is used to produce the moulded skin, silicone, for example, is suitable as material for the mould insert or inserts. A person skilled in the art is naturally also familiar with other suited materials of which mould inserts of the said type can be produced.

Variants, for example recessed regions required for the attachment of applications may be formed in a simple manner. Thus, in order to produce moulded skin variants it is merely necessary to adapt the mould surface to the moulded skin variant to be produced by applying one or more mould inserts to the mould surface of the base mould before applying the uncured plastic compound to the mould surface. Since the mould inserts are elements, which influence the shape of the moulded skin to be produced, these should be assigned to the tool side in the same way as the other regions of the mould surface of the mould. For this reason, the mould inserts should be removed from the moulded skin which has been brought to shape after the end of the production process. The mould insert or inserts can be separated from the moulded skin produced in the course of demoulding the moulded skin from the mould surface of the mould or in a step following this demoulding step. In the latter case, the mould insert or inserts or individual ones of these are removed from the moulded skin after this has been demoulded from the mould surface of the mould. Unlike the method described in WO 95/32850 A1, moulded skin variants having a different geometry and not merely a different colour can be produced by this method. Equally it is possible to use the described method to produce multicoloured moulded skins or to integrate this in the method according to WO 95/32850 A1.

The mould insert or inserts may be used to form positioning aids on which decorative material can be attached to the outside of the moulded skin in a subsequent step. These can comprise shoulders or projections or recesses.

The mould insert or inserts can be used to function as supports for one or more elements to be connected to the moulded skin. This applies particularly to moulded skins formed by spraying a plastic compound onto the mould surface. These elements to be connected to the moulded skin form a part of the moulded skin after curing of said moulded skin. For example, such elements can have a head which is integrated in the moulded skin. These elements can comprise parts of connectors to which applications can be fastened. In addition to numerous other possibilities, these connector parts can, for example, comprise clips, double-sided adhesive tape or one part of a Velcro fastener. In addition to such elements used as connectors, a mould insert can also serve as a support for other objects which are to be connected to the moulded skin in the course of the production process thereof.

In this method, the mould insert can also be designed to form an edge or a gap inside the moulded skin to be produced. If this is desired, the mould insert has an extension which projects through the plastic compound to be applied. If the formation of a gap is desired, the extension can be considered to be annular. Annular in the sense of these explanations is to be understood as any arbitrary closed geometry of such an extension. In such an embodiment, it is possible to apply a foam compound to be applied to the back of the moulded skin if the moulded skin is still located on or at the mould surface. Then, a mould insert can likewise be used to create a gap through a foam layer adjoining the moulded skin. In this way, edges and gaps can be created without these needing to be stamped out subsequently. By means of this measure, it is possible to create the moulded skin itself in a gap or around a marginal termination with the result that an application to be inserted in such a gap, for example, need not necessarily grip over the moulded skin with a collar.

Typically the support structure is located on the back of the foam layer. With such a gap and/or an edge region configured in such a manner, applications to an inner lining part configured in such a manner can be fastened directly to the relatively stable support structure. The same applies to the fastening of such an inner lining part to the inside of the chassis or the doors of a motor vehicle.

Particularly suitable for the attachment of a subsequent application to an flexible moulded skin is one in which a receptacle for receiving the edge of an application to be attached on the recessed region is provided in the area of the connection of the recessed region to the wall. The provision of a receptacle for receiving the edge of an application to be attached on the recessed region can be used for positional fixing of the same. Thus, the position of the application on the moulded skin is defined by the position of the moulded skin as such and the position of the receptacle. This is helpful when mounting an application wherein tolerances in the gap dimensions between such an application and the moulded skin fluctuate in only a narrow tolerance range. Such a receptacle can, for example, be configured as a recess in the bottom of the recessed region.

If it is provided that a design application is adhesively bonded to the moulded skin, for example, by means of a foam, it is expedient if burs are provided protruding from the bottom of this region at a short distance from the wall of the moulded skin delimiting the recessed region and following the longitudinal extension of the wall. A receptacle, as described previously, is likewise formed by such a lug. In an adhesive bond such a lug is surrounded by the adhesive and thereby incorporated in the adhesive bond. By providing one or more such lugs, the adhesive base provided by the moulded skin is enlarged by the surface of the lug. Specifically in the edge zone of an application to the attached to the flexible moulded skin, especially when the application comprises a non-flexible body, possibly a wooden panelling, particular emphasis is placed on a good adhesive bond. These requirements are satisfied by such a lug.

Such a lug is preferably formed during the manufacturing process of the moulded skin. A lug as a clamping element may be formed particularly easily by leaving a certain marginal gap between a mould insert and the adjoining mould surface of the mould and the uncured plastic compound applied to the mould surface penetrating between the mould insert and the mould surface in another manner. After removing the cured moulded skin from the mould surface, this material forms the lugs projecting from the visible side of the moulded skin. Thin edges or the like are also to be subsumed under the term "lugs" used in the context of these explanations.

The surface of the mould insert or inserts may be textured or not textured as already pointed out previously. A texturing of the surface of such a moulded skin can serve the purpose of enlarging the surface of an element to be attached, in particular by means of adhesion. Equally, the texturing can serve to produce a specified surface texture of the moulded skin outer side.

A mould insert can also be used to form positioning structures or decorative elements.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
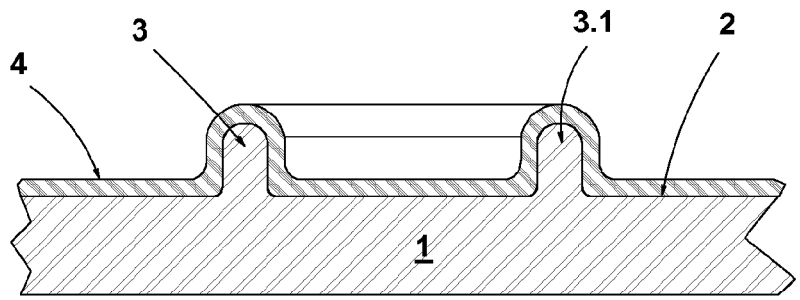
FIG. 1, 1a are a schematic cross-section through a mould having a first mould surface and a moulded skin sprayed thereon and then cured (FIG. 1) and the moulded skin demoulded from the mould surface (FIG. 1a).
Figure 1A:
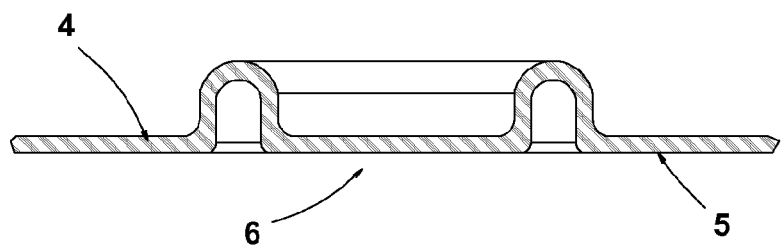

A mould 1 for manufacturing a flexible moulded skin of sprayable plastic, for example, polyurethane, has a first mould surface 2. The mould surface 2 is structured according to the geometry of the moulded skin to be produced. Part of the structuring is an elongate design element, for forming which the mould 1 comprises an upstanding edge in the form of the outline of a design element. Of this ring shaped edge in FIG. 1 the longitudinal edges 3, 3.1 can be seen. The mould surface 2 has been sprayed with a polyurethane compound to produce the desired moulded skin. The polyurethane compound cross-links on the mould surface 2 and can easily be separated from the mould surface 2 after completion of the cross-linking process (the curing process). The moulded skin is identified by the reference numeral 4 in FIGS. 1, 1a. The visible side 5 of the moulded skin 4 is that surface of the moulded skin 4 which abuts against the mould surface 2. The mould surface 2 is typically provided with a structuring so that the visible side 5 of the moulded skin 4 has a surface structure, for example, is grained.

Figure 2:
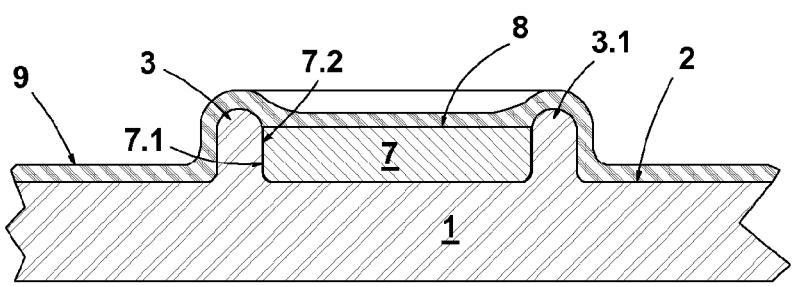
FIG. 2-2c are a schematic cross-section through the mould from FIG. 1 having an alternative effective mould surface because of a use of a mould insert and a moulded skin sprayed and cured thereon (FIG. 2), the moulded skin demoulded from the mould surface (FIG. 2a), and with an application insert attached to the moulded skin (FIG. 2b) and the arrangement from FIG. 2b with a foam layer applied to the back of the moulded skin and a backing support structure (FIG. 2c).

In order to produce a variant to the moulded skin 4 which differs in respect of the design element 6 formed by the upturned edge of the mould 1, according to one embodiment a mould insert 7 (cf. FIG. 2) is inserted in the mould surface region bordered by the edges 3, 3.1. The mould insert 7 consists of an flexible and/or elastic silicone material to which the plastic compound used to form the moulded skin does not adhere or adheres only insignificantly. The mould insert 7 fills the mould surface region filled by the edges 3, 3.1 so that the effective mould surface of the mould 1 is partly formed by the original mould surface 2—the first mould surface—and partly by the mould surface 8 of the mould insert 7.

After modifying the first mould surface 2 by inserting the mould insert 7 in order to manufacture a variant of the moulded skin 4 a plastic compound such as a polyurethane composition is applied, for example sprayed onto the altered mould surface. After completion of the cross-linking process, the moulded skin 9 may be removed from the mould surface, wherein this step also includes demoulding the cured flexible moulded skin 9 from the mould insert 7. The moulded skin 9 separated from the mould 1 is shown in FIG. 2a.

In this exemplary embodiment, the mould insert 7 is dimensioned with regard to the abutting arrangement of the side surface 7.1 of the mould insert 7 against the upstanding wall 7.2 of the edges 3, 3.1 in such a manner that a certain marginal gap remains between the sides of the mould insert 7 pointing towards the edges 3, 3.1 and the edges 3, 3.1 themselves. This has the effect, as may be seen from FIG. 2a, that a flag-like plastic lug 12 is formed at a distance from the wall 11 bordering a recessed region 10, formed by the mould insert 7. This projects from the bottom 13 of the recessed region 10. The recessed region 10 is formed by the mould insert 7 as a recess. The lug 12 comprises a plastic skin extending along the bottom 13. As a result of the small gap between the insert 7 and the original mould surface 2, the lug 12 is irregular in its extension.

Figure 2A:
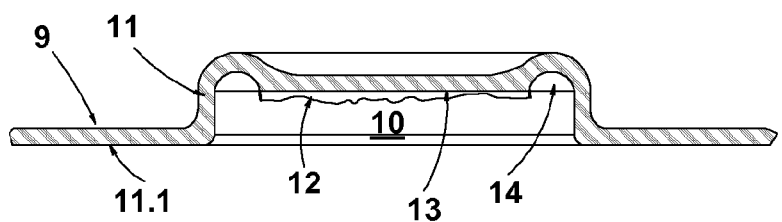

As to be seen from FIG. 2a the edges of the recessed region with the visible front side of the moulded skin 9 are clean and in particular do not carry any protruding plastic material. Thus, into the recessed region 10 also an insert application may be mounted, which does not abut with the wall 11. In particular such insert does not need a blind covering this edge.

Figure 2B:
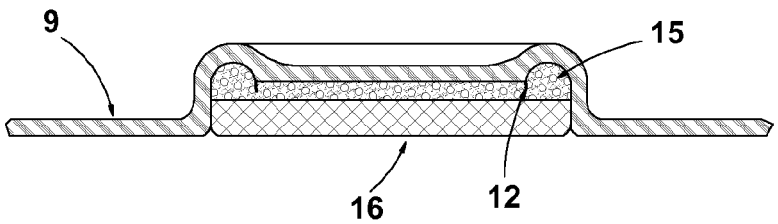

The insert 7 of this embodiment does not completely fill the border of the mould 1 formed by the peripheral edge so that the edge upper sides of the mould 1 inside the moulded skin 9 form a peripheral recess 14. In the exemplary embodiment shown, the recess 14 and the plastic lug 12 serve to enlarge the surface of the bottom 13 of the recessed region 10. This is used for improved bonding of an adhesive foam 15 (cf. FIG. 2b) by which means, for example, a design application 16 is fastened in the recessed region 10. The design application 16 can, for example, comprise a genuine wood strip. The diagram in FIG. 2b makes it clear that the lug 12 is embedded in the adhesive foam 15 and therefore effectively serves for connection of the adhesive foam 15 to the moulded skin 9.

Figure 2C:
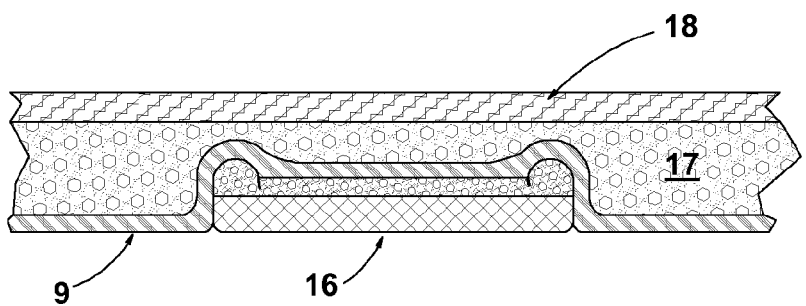

The moulded skin 9 is a part of an inner lining part for a motor vehicle. For this reason, the moulded skin 9, as shown in FIG. 2c, is backed with a foam layer 17 which in turn adjoins a support structure 18 made of a hard plastic. If desired, the foam layer 17 and the support structure 18 can be applied to the moulded skin 9 still lying on the mould 1 and therefore before demoulding said moulded skin.

Figure 3:
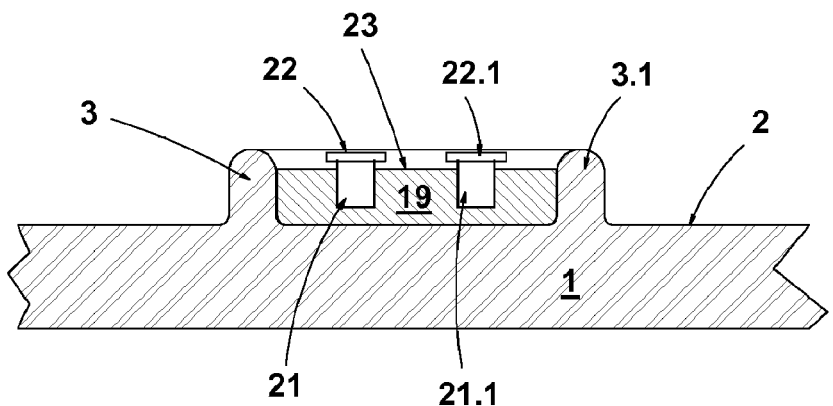
FIG. 3-3b are the mould of FIG. 1 with an insert equipped to configure another alternative mould surface (FIG. 3) together with a moulded skin sprayed onto the mould surface and cured (FIG. 3a) and the moulded skin after demoulding from the mould surface (FIG. 3b).
Figure 3A:
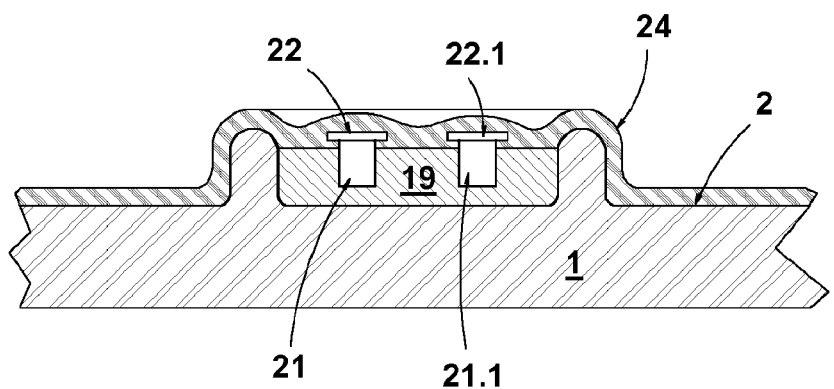

In order to form another variant of the moulded skin 4, another insert is inserted within the area enclosed by the upstanding edge with its longitudinal edges 3, 3.1. Such further mould insert 19 is shown in FIG. 3. This has the same properties as the mould insert 7 described in FIGS. 2-2c. Unlike the mould insert 7, the mould insert 19 not only serves to form a recessed region 20 (cf. FIG. 3b) but also for supporting clip connector elements 21, 21.1 which are shown schematically in FIG. 3-3b. In the moulded skin variant shown in FIGS. 3-3b, the clip connector elements 21, 21.1 are intended to be incorporated into the moulded skin to be produced. For this purpose the clip connector elements each have a head 22, 22.1 arranged at a distance from the surface 23 of the mould insert 19 co-forming the mould surface. The clip connector elements 21, 21.1 are held loosely in corresponding receptacles of the mould insert 19.

Figure 3B:
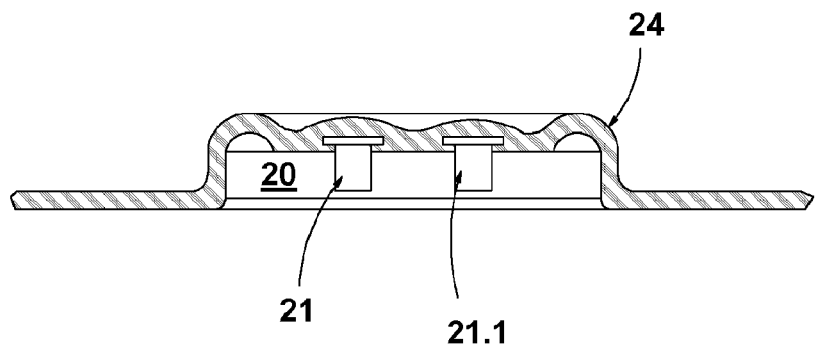

With spraying on the uncured plastic compound to form the desired moulded skin 24, the heads 22, 22.1 are embedded in the moulded skin 24 (cf. in particular FIG. 3b). After leaving the moulded skin 24 to cure on the mould surface of the mould 1 modified by the mould insert 19 with respect to the original mould surface 2, the moulded skin 24 is demoulded from the mould surface. In the course of removing the mould insert 19, the clip connector elements 21, 21.1 are withdrawn from the corresponding receptacles so that their portions effective for a connection are located inside the recessed region 20 and protrude from the surface of the bottom of the recessed region 20. Typically located on the back of the moulded skin 24 is a foam layer which in turn adjoins a support structure as has already been described for the exemplary embodiment in FIGS. 2-2c, in order to impart the necessary stiffness to the interior lining part. An application, for example, an appliance or the like can be placed on the clip connector elements 20, 21.1.

From the description of the exemplary embodiment of FIGS. 3-3b, a person skilled in the art will note, that there are numerous possibilities for being able to connect different objects to the moulded skin or also to a foam layer located therebehind or also to the support structures located therebehind, wherein a mould insert serves as a support for the element or elements to be connected to the part to be produced. Connecting such elements to the foam layer and/or the support structure is possible if these plastic layers are applied to the moulded skin still lying on the mould surface of the mould 1. In principle, it is also possible that the moulded skin is produced in a first production step and this is then demoulded from the mould together with the mould insert carrying the elements and subjected to another working step such as, for example, the application of the foam layer or the structure support. The mould insert is only removed after the layer supporting the elements has cured. It will thus be evident for a person skilled in the art, that such mould insert, which could cover a bigger part of the moulded skin may be used as a handling device until the moulded skin has been attached to a more rigid backing structure, for example as part of a trim panel.

Figure 4:
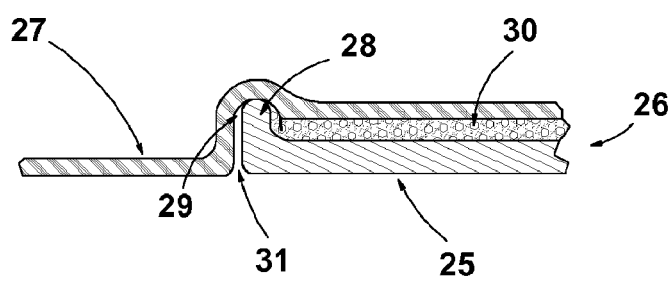
FIG. 4 shows a schematic partial cross-section through the section of a moulded skin with an application connected to the moulded skin.

FIG. 4 shows schematically the connection of a design element 25 as an insert in a previously formed recessed region 26. The moulded skin 27 in this exemplary embodiment has been produced as described for FIGS. 2, 2a. The design element 25 has a fixing edge 28 which engages in a recess 29 of the moulded skin 27. In addition, the design element 25 is connected to the moulded skin 27 by means of adhesive foam 30, as has already been described. The fixing edge 28 is used for positional fixing of the design element 25 inside the recessed region 26 of the moulded skin 27. Thus, additional tools for producing a gap 31 having the same width peripherally can be dispensed with.

Figure 5:
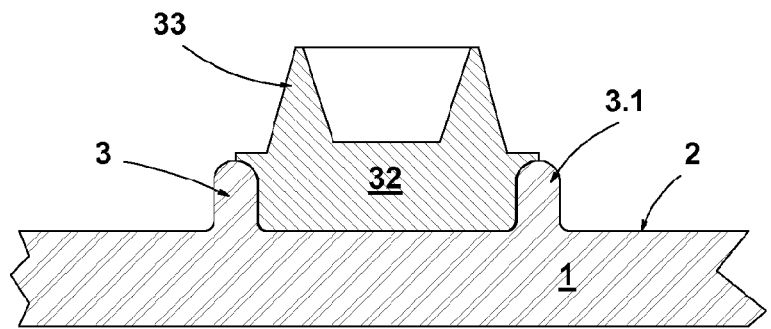
FIG. 5-5b show the mould of FIG. 1 with another insert (FIG. 5) and with a moulded skin sprayed onto the mould surface and cured, having a foam layer disposed on the back (FIG. 5a) as well as demoulded from the mould surface and provided with a support structure (FIG. 5b).
Figure 5A:
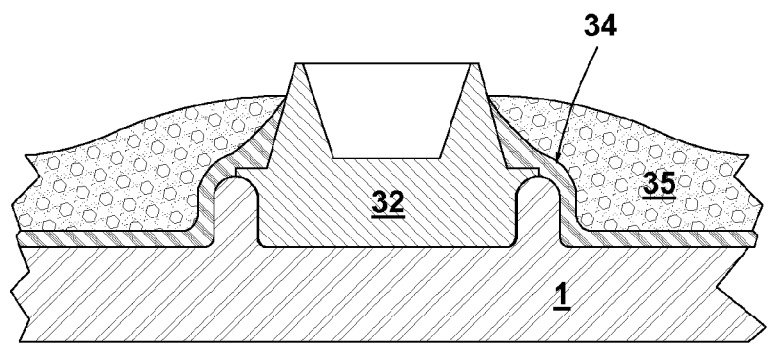
Figure 5B:
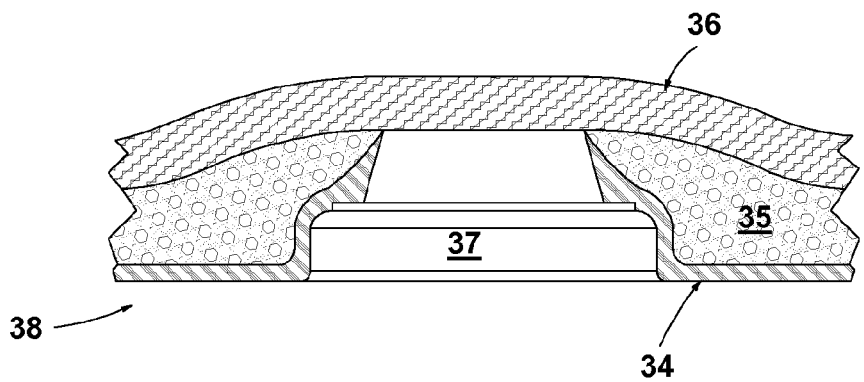

FIG. 5 shows the mould 1 for forming a moulded skin according to another moulded skin variant. In this exemplary embodiment, a mould insert 32 has been inserted in the border formed by the edge, whereby a gap is to be produced inside the moulded skin to be produced. The mould insert 32 likewise comprises an elastomer silicone element. In the exemplary embodiment shown, this has an annularly design extension 33 which projects so far from the mould surface that it protrudes at the top when spraying the mould surface with the plastic compound. The process of spraying the plastic compound to produce the moulded skin 34 involves spraying onto the mould surface modified by the mould insert 32 compared with the original mould surface of the mould 1 and specifically in such a manner that the plastic compound becomes thinner at the outer wall of the extension 33. After leaving this plastic compound forming the moulded skin 34 to cure, a foam layer 35 is applied to the back of the moulded skin 34 in the exemplary embodiment shown. The foam layer 35 also has specific elastic properties. During the production of the foam layer 35, the mould insert 32 also serves as a placeholding element for keeping the desired gap free. After leaving the foam layer 35 to cure, the moulded skin 34 is demoulded together with the foam layer 35 from the mould 1, which likewise includes demoulding from the mould insert 32. At the back, the arrangement of moulded skin 34 and foam layer 35 is then fitted with a hard plastic support structure 36. The support structure 36 imparts its desired stability to the interior lining part 38 produced in such a manner. The gap formed by the mould insert 32 inside the moulded skin 34 and the foam layer 35 is characterised in the reference numeral 37 in FIG. 5b. The gap 37 is used in the interior lining part 38 to fasten an insert or a device directly to the support structure 36 therein. The diagram of the interior lining part 38 in FIG. 5b makes it clear that unlike the gaps produced by stamping out in the conventional manner, the moulded skin 34 is drawn into the area of the gap 37. In particular, the foam layer 35 is completely bordered by the moulded skin 34.

Figure 6:
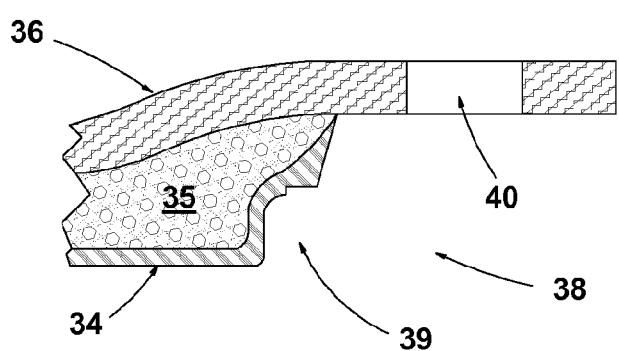
FIG. 6 shows in a schematic cross-sectional view the edge zones of an inner lining part for a motor vehicle.

In a further moulded skin variant using the mould 1 and its mould surface, FIG. 6 shows an edge formation as an example. The edge formation shows an edge of the interior lining part 38 in which the support structure 36 projects over the marginal termination 39 of the moulded skin 34 and therefore also of the foam insert 35. The marginal termination 39 has likewise been produced by using a free-holding mould insert. A plurality of gaps 40 following the edge are incorporated in the projecting section in the carrier structure 36, of which one can be seen in FIG. 6. The gaps are used to fasten the interior lining part 38 to another interior lining part and/or to the inside of the chassis of a vehicle. In this edge formation, it should also be stressed that the moulded skin 34 is guided around the lateral termination of the foam layer 35.

In the preceding exemplary embodiments, the respective mould inserts are held fixed on the first mould surface of the base mould by way of being positioned between upturned walls of the first mould surface. The upturned edges of such mould may also be formed mushroom-head-shaped in order to form undercut recesses in contrast to the recesses shown in the exemplary embodiments depicted. Furthermore, the edges can be designed inclined.

Figure 7:
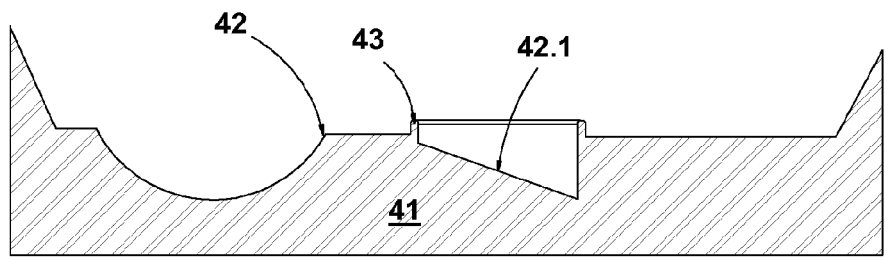
FIG. 7-7c show a schematic cross-section through a mould with a first mould surface (FIG. 7), a flexible skin moulded on the mould surface of the mould of FIG. 7 (FIG. 7a), the mould of FIG. 7 with an alternative effective mould surface by having arranged a mould insert on the first mould surface (FIG. 7b), and a flexible skin moulded on the mould surface of the mould of FIG. 7b (FIG. 7c).

In another exemplary embodiment FIG. 7 shows a mould 41 with a structured mould surface 42. The moulded flexible skin manufactured on the mould surface 42 of this mould 41 is to be used as the covering of a trim panel 4 of a vehicle. The left hand side of the mould surface 42 is the area of the so called eyebrow on the steering wheel side; the right side is the area, behind which an airbag is situated, and between these areas is an area of a middle eyebrow. This middle eyebrow has an inclined surface 42.1, which section of the moulded skin is used for inserting instruments being inclined towards the driver. The moulded skin shaped on the mould surface 42 is depicted in FIG. 7a.

The inclined section 42.1 is bordered by an upstanding edge 43 standing up from the mould surface 42. Thus from the side of application of the plastic compound the inclined section 42.1 is the bottom of a recess.

Figure 7A:
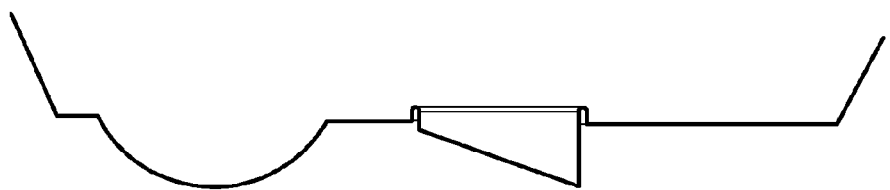
Figure 7B:
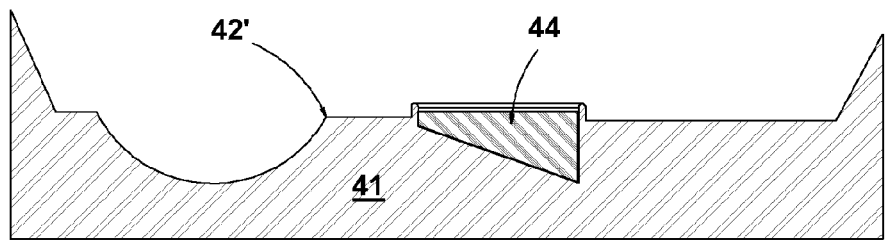
Figure 7C:
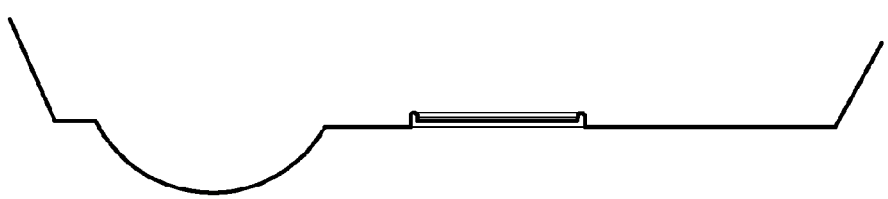

To manufacture a moulded skin as a variant to the skin depicted in FIG. 7a, which has no inclined section, into the recess enclosed by the upstanding edge 43 a silicon mould insert 44 is introduced (cf. FIG. 7b). Onto the thus altered first mould surface—the effective mould surface 42'—a plastic compound is applied, in particular sprayed and cured. The skin manufactured with the mould 41 and its mould surface 42' is shown in FIG. 7c.

In yet another alternative embodiment, the mould surface of a mould has a recess for selectively receiving one or more mould inserts.

In a further development likewise not shown in the figures, it is provided that mould inserts have a modular structure so that a mould insert applied to the mould surface is actually composed of a plurality of individual mould insert parts. A mould insert applied onto another mould insert may be hold on that mould insert in the same manner as described in the depicted embodiments. Thus a first mould insert to carry another mould insert shows areas delimited by an upstanding edge. In this design, it is possible to form different mould inserts and therefore different moulded skins by using different mould inserts.

The description of the invention makes it clear that the mould insert or inserts used are used to form alternative moulded skin geometries compared to the mould surface provided by the mould itself, wherein mould inserts with their shaping surface can also be used as structure-imparting bodies. In this case, the shaping surface of such a mould insert can be used to form various surface structures on the moulded skin. The shaping surface of such a mould insert can be configured to form almost any structures on the moulded skin to be formed thereon.

The invention has been described with reference to individual exemplary embodiments. Nevertheless, numerous further possible embodiments are deduced for a person skilled in the art from the claims.

Reference List

| | |
|---|---|
| 1 | Mould |
| 2 | Mould surface |
| 3, 3.1 | Longitudinal edge |
| 4 | Moulded skin |
| 5 | Visible side |
| 6 | Design element |
| 7 | Mould insert |
| 7.1 | Side surface |
| 7.2 | Wall |
| 8 | Mould surface |
| 9 | Moulded skin |
| 10 | Region |
| 11 | Wall |
| 11.1 | Visible front side |
| 12 | Lug |
| 13 | Bottom |
| 14 | Recess |
| 15 | Adhesive foam |
| 16 | Design application |
| 17 | Foam insert |
| 18 | Support structure |
| 19 | Mould insert |
| 20 | Region |
| 21, 21.1 | Clip connector element |
| 22, 22.1 | Head |
| 23 | Surface |
| 24 | Moulded skin |
| 25 | Design element |
| 26 | Region |
| 27 | Moulded skin |
| 26 | Fixing edge |
| 29 | Recess |
| 30 | Adhesive foam |
| 31 | Gap |
| 32 | Mould insert |
| 33 | Extension |
| 34 | Moulded skin |
| 35 | Foam insert |
| 36 | Support structure |
| 37 | Gap |
| 38 | Interior lining part |
| 39 | Termination |
| 40 | Gap |
| 41 | Mould |
| 42, 42' | Mould surface |
| 42.1 | Inclined section |
| 43 | Upstanding edge |
| 44 | Mould insert |

The invention claimed is:

1. A method for manufacturing a moulded flexible plastic skin and variants thereof, which flexible plastic skins differ in their shape from each other, comprising the steps:
providing an effective mould surface matching the shape of the skin to be moulded by either using a first mould surface to manufacture a skin in a first shape, said first mould surface provided by the base mould or by using a second mould surface to manufacture a skin in a second shape, said second mould surface provided by placing one or more mould inserts onto the first mould surface, said insert covering only a part of the first mould surface, each insert providing a mould surface as part of the effective mould surface, and thereby providing an alternative second mould surface;
applying a plastic compound to be moulded on said effective mould surface provided;
bringing to shape the plastic compound applied to the effective mould surface,
demoulding the moulded skin from the effective mould surface, and
wherein that the at least one mould insert used is flexible, whereas such mould insert is arranged on the first mould surface in that the side surfaces of the insert adjoining its own mould surface abut against a wall of the first mould surface arranged angular to the adjacent first mould surface.

2. The method according to claim 1, wherein the insert is arranged on the first mould surface that its side surfaces abutting such wall of the first mould surface are put under a pre-stress in their abutting engagement to the upstanding wall.

3. The method according to claim 1 wherein the more than one mould insert is used to provide the effective mould surface, whereas the mould inserts are placed on different sections of the first mould surface.

4. The method of claim 1 wherein more than one mould insert is used to provide the effective mould surface, whereas at least one mould insert is arranged on the mould surface of a first mould insert.

5. The method of claim 1 wherein a plastic compound is applied to the effective mould surface of a mould.

6. The method of claim 5, wherein the moulded skin is made of polyurethane.

7. The method of claim 5 wherein a mould insert serves as a support for holding one or more elements to be connected to the moulded skin, which elements remain as part of the moulded skin after separation of the mould insert from the moulded skin.

8. The method of claim 7, wherein the element or elements to be connected to the moulded skin are parts of connectors for connecting objects to the moulded skin.

9. The method of claim 5, wherein a mould insert has an extension projecting through the plastic compound to be applied or terminating flush with it.

10. The method of claim 1 wherein the at least one mould insert is made of silicone or a silicone material.

11. The method of the claim 1 wherein the at least one mould insert this insert is used to provide a texturized surface on the moulded skin.

12. A mould arrangement for moulding a flexible plastic skin and variants thereof, which flexible plastic skins differ in their shape from each other the arrangement comprising:

a base mould with a first mould surface for manufacturing a skin in a first shape;

one or more mould inserts to be arranged on the first mould surface and covering only a part of the first mould surface and when applied to the first mould surface each insert providing a mould surface as part of the effective mould surface thus defining a mould with an alternative effective mould surface for manufacturing a skin in a second shape;

wherein the at least one mould insert is flexible; and the first mould surface carries one or more walls arranged angular to the adjacent mould surface, in particular upstanding from its first mould surface and the mould inserts abut with their side surfaces adjoining their own mould surfaces against such wall at least in those sections of the insert used for shaping the plastic compound.

13. The mould arrangement of claim 12, wherein the mould insert is arranged on the first mould surface with a pre-stress load in the abutting arrangement of the side surfaces of the insert against such wall of the base mould.

14. The mould arrangement of claim 12 wherein the mould surface of the base mould has discrete sections for mould inserts to be placed.

15. Mould arrangement the claim 12 wherein a first mould insert has a section, onto which a second mould insert may be arranged in such a manner, in which the first mould insert is arranged on the first mould surface of the base mould.

* * * * *